US012591081B2

(12) United States Patent
Brown et al.

(10) Patent No.: US 12,591,081 B2
(45) Date of Patent: Mar. 31, 2026

(54) ABRASION RESISTANCE FOR PATTERNED LENS

(71) Applicant: HOYA Optical Labs of America, Inc., Lewisville, TX (US)

(72) Inventors: Jeffrey Brown, Ramsey, MN (US); David Olund, Ramsey, MN (US); Hannah Vu, Ramsey, MN (US); Jose A. Orozco Rodriguez, Ramsey, MN (US); Griff Altmann, Ramsey, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 537 days.

(21) Appl. No.: 18/058,636

(22) Filed: Nov. 23, 2022

(65) Prior Publication Data

US 2023/0161080 A1 May 25, 2023

Related U.S. Application Data

(60) Provisional application No. 63/264,502, filed on Nov. 23, 2021.

(51) Int. Cl.
| | |
|---|---|
| *G02B 1/14* | (2015.01) |
| *G02B 1/113* | (2015.01) |
| *G02B 3/00* | (2006.01) |

(52) U.S. Cl.
CPC .............. *G02B 1/14* (2015.01); *G02B 1/113* (2013.01); *G02B 3/0031* (2013.01)

(58) Field of Classification Search
CPC ........ G02B 1/14; G02B 1/113; G02B 3/0031; B29D 11/00009; B29D 11/00326; B29D 11/00865; B29D 11/0073; G02C 7/022; G02C 2202/16
See application file for complete search history.

(56) References Cited

U.S. PATENT DOCUMENTS

| | | | |
|---|---|---|---|
| 11,112,622 B2 | 9/2021 | Coppa | |
| 11,947,194 B2 | 4/2024 | Newman | |
| 12,121,930 B2 | 10/2024 | Ishizaki et al. | |
| 2004/0125335 A1 | 7/2004 | Vu | |
| 2007/0217019 A1 | 9/2007 | Huang et al. | |
| 2009/0305049 A1* | 12/2009 | Kobuchi | B32B 27/40 |
| | | | 428/476.3 |
| 2013/0059068 A1 | 3/2013 | Yajima | |

(Continued)

FOREIGN PATENT DOCUMENTS

| | | | |
|---|---|---|---|
| EP | 3640712 A1 | 4/2020 | |
| EP | 3730269 A1 * | 10/2020 | G02B 1/041 |

(Continued)

OTHER PUBLICATIONS

WIPO, U.S. International Search Authority, International Search Report and Written Opinion mailed Mar. 3, 2023 in International Patent Application No. PCT/US2022/080445, 12 pages.

(Continued)

*Primary Examiner* — Jonathan Y Jung
(74) *Attorney, Agent, or Firm* — Inskeep IP Group, Inc.

(57) ABSTRACT
A patterned lens with abrasion resistance having a base layer hard coat and a top hard coat. The base layer hardcoat may be formed on a film or sheet and used in molding the patterned lens. The top hard coat may be applied after molding.

16 Claims, 3 Drawing Sheets

(56)         References Cited

U.S. PATENT DOCUMENTS

| 2013/0211517 | A1* | 8/2013 | You ........................ G02B 1/043 |
| | | | 427/2.24 |
| 2013/0329184 | A1* | 12/2013 | Barzak ............... B29D 11/0073 |
| | | | 264/1.32 |
| 2017/0003420 | A1* | 1/2017 | Berit-Debat ............. G02B 1/14 |
| 2021/0354409 | A1 | 11/2021 | Guillot et al. |
| 2021/0354410 | A1 | 11/2021 | Guillot et al. |
| 2021/0356763 | A1* | 11/2021 | Le Saux ................ G02C 7/022 |
| 2021/0387430 | A1* | 12/2021 | Toyoshima ............. B29C 33/42 |
| 2022/0410511 | A1* | 12/2022 | Ambur ............... B29D 11/0048 |
| 2024/0248326 | A1 | 7/2024 | Qi et al. |

FOREIGN PATENT DOCUMENTS

| EP | 3779567 A4 | 12/2021 |
| EP | 4083687 A4 | 3/2024 |
| EP | 4083688 A4 | 3/2024 |
| EP | 4083691 A4 | 4/2024 |
| JP | 2010-107974 A | 5/2010 |
| WO | WO 2019/166659 A1 | 9/2019 |
| WO | WO 2019/189764 A1 | 10/2019 |
| WO | WO 2019/189847 A1 | 10/2019 |

OTHER PUBLICATIONS

European Patent Office, Extended European Search Report dated Oct. 27, 2025 in European Patent Application No. 22899559.3, 9 pages.

* cited by examiner

100

| | Coated Laminate Results | | | |
| | Fit R Seg Dia Ave (mm) | Fit R Seg Height Ave (μm) | Calib. Fit R Defocus (D) | Base Curve (@1.530)(D) |
|---|---|---|---|---|
| Average | 0.969 | 0.744 | 3.774 | 2.971 |
| Standard Deviation | 0.017 | 0.027 | 0.008 | 0.008 |

| | No Laminate | | | |
| | Fit R Seg Dia Ave (mm) | Fit R Seg Height Ave (μm) | Calib. Fit R Defocus (D) | Base Curve (@1.530)(D) |
|---|---|---|---|---|
| Average | 0.968 | 0.758 | 3.858 | 2.958 |
| Standard Deviation | 0.019 | 0.029 | 0.009 | 0.011 |
| p-Value | 0.86 | 0.20 | 0.00 | 0.00 |

FIG. 6

ABRASION RESISTANCE FOR PATTERNED LENS

RELATED APPLICATIONS

This application claims benefit of and priority to U.S. Provisional Application Ser. No. 63/264,502 filed Nov. 23, 2021 entitled Abrasion Resistance For Patterned Lens, which is hereby incorporated herein by reference in its entirety.

BACKGROUND OF THE INVENTION

Lenses with patterns are known to provide utility for specialized effects on the wearer's eye. For example, a lens patterned with micro lenses has been shown to provide an effective treatment in mitigating the onset of rapid myopic development in children. An example of such a micro lens-patterned lens is shown in U.S. Pat. No. 11,029,540, the entirety of which is incorporated herein by reference.

Such patterned lenses are typically formed via injection molding so as to enable precise replication of the optical features from molding inserts. The molding process is performed using thermoplastics such as polycarbonate or nylon. These materials do not, however, provide a level of abrasion resistance desired by some users and the lens can be damaged during some types of handling.

To increase abrasion resistance on an ophthalmic lens, it is common in the art to apply a hardcoat on the surface of the lens. This is typically done by either a dip coating or a spin coating process. Such a hardcoat can dramatically improve the abrasion resistance of a polymeric lens surface, particularly when applied in a thickness range of 3-5 microns.

When such a hardcoat is used with patterned lenses, however, and particularly when that pattern is comprised of micro lenses as described in U.S. Pat. No. 11,029,540, the hardcoat can affect the optical performance of the pattern, e.g., the micro lenses, and thereby degrade the efficacy of the lens.

One way to limit this undesirable effect of a hardcoat is to reduce the thickness of the hardcoat. However, a reduction in thickness also diminishes the quality of the abrasion resistance provided by the hardcoat. It is therefore desirable to formulate a lens that maximizes the abrasion resistance of the patterned lens while maintaining the required optical performance of the patterned lens. It is also desirable to formulate such a lens generally and not just for a patterned lens.

SUMMARY OF THE INVENTION

Disclosed herein are systems, devices, and methods for maximizing abrasion resistance of a lens element while maintaining the required optical performance of the lens elements, particularly with respect to patterned lens elements which incorporate a plurality of microlenses for mitigating the onset of rapid myopic developments in patients such as children.

In an example embodiment, coated film may be utilized during the injection molding process of patterned lenses to create a base layer which increases surface hardness while accurately replicating mold insert features.

In an example embodiment, a base layer improving abrasion resistance of the lens may be combined with a conventional hardcoating.

In an example embodiment, under cured or partially cured coating may be utilized on a film to increase formability during injection molding.

In an example embodiment, dual-cured thermally and/or light-cured coating where the coating is partially cured through a thermal process may be utilized to provide sufficient adhesion to the film and thermo-forming capabilities.

In an example embodiment, a light-cured coating may be utilized where the coating is exposed to a light curing source such as UV, LED, or visible with low dosage after application onto the film.

In an example embodiment, a formable coated film with sufficient flexibility may be utilized such that the coating on the flat film does not crack after being thermally formed into formed wafer or after being formed into patterned lenses with an injection molding process.

In an example embodiment, a process may be utilized to expose patterned lenses after injection molding to various light sources, such as UV, LED, or visible light, to complete coating/curing and thereby improve abrasion resistance.

In an example embodiment, a heat treatment process may be utilized with the patterned lens after injection molding to fully cure the coating and thereby provide improved abrasion resistance.

In an example embodiment, a coated laminate may be utilized in addition to a single layer film. The film thickness may range from about 0.1 mm to 2.0 mm and the coating thickness may range from about 0.5 microns to 20 microns.

In an example embodiment, under-cured coatings may be utilized on the film to improve adhesion of the hardcoating applied after molding the lens.

In an example embodiment, polycarbonate film and lens material may be utilized.

In an example embodiment, nylon lens material and film may be utilized.

In an example embodiment, the coated film may be preformed prior to injection molding.

In an example embodiment, abrasion resistance coatings may be applied to the finished lens.

In an example embodiment, a coated film may be utilized without an additional hardcoating after injection molding.

In an example embodiment, a single layer hardcoating may be utilized.

In an example embodiment, a primer layer and a hardcoating layer may be utilized.

In an example embodiment, the coating may be applied on the film using spin coatings.

In an example embodiment, the coating may be applied on the film using roll-to-roll coating, such as Gravure or slot die.

In an example embodiment, the coating may be applied on the film in the shape of a flat wafer.

In an example embodiment, the coating may be applied on the film in the shape of a formed wafer.

In an example embodiment, liquid containing solvents may be applied onto the film and the evaporation of the solvents may form a coating layer on the film.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which:

FIG. 6 is a table illustrating defocus testing results in accordance with an example embodiment.

DETAILED DESCRIPTION

Figure 1:
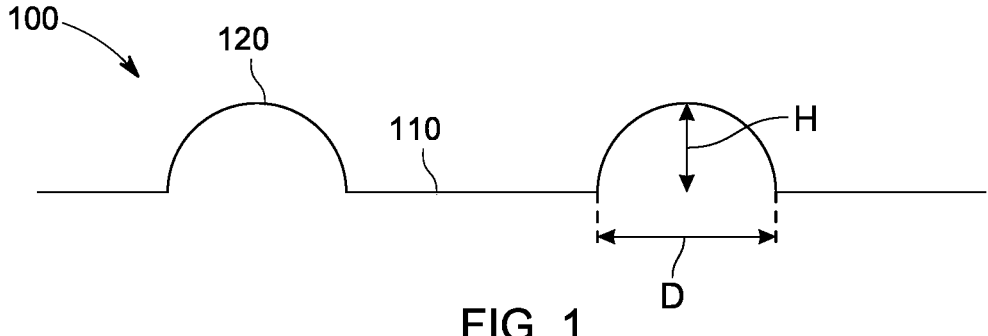
FIG. 1 is a cross-sectional view of a patterned lens including microlenses in accordance with an example embodiment.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

While different embodiments may be described in this specification, it is specifically contemplated that any of the features from different embodiments can be combined together in any combination. In other words, the features of different embodiments can be mixed and matched with each other. Hence, while every permutation of features from different embodiments may not be explicitly shown, it is the intention of this specification to cover any such combinations.

For the purposes of this specification, use of the terms "about", "around", or "approximately" when referring to a value may be understood to mean within 5% of the stated value (either greater or lesser), inclusive.

FIG. 1 illustrates a cross section of an example embodiment of a patterned ophthalmic lens 100, e.g., a lens element 110 having a plurality of microlenses 120 on the surface thereof. As shown in FIG. 1, the patterned ophthalmic lens 100 may comprise a plurality of microlenses 120 on the surface of the ophthalmic lens 110. Each of the plurality of microlenses 120 may comprise various shapes or configuration, including but not limited to spherical, toric, or aspherical. Each of the plurality of microlenses 120 may have a single focus point (e.g., cylindrical power) or may have a non-focusing point (e.g., for use in preventing progression of myopia or hyperopia).

The use of a plurality of microlenses 120 on the surface of the ophthalmic lens 110 may provide a variable optical power configuration. For example, the ophthalmic lens 110 surface may provide a first optical power and the plurality of microlenses 120 may provide a second optical power which is different from the first optical power. In some example embodiments, the plurality of microlenses 120 may provide multiple or a plurality of optical powers which are different from the first optical power of the ophthalmic lens 110 surface. Thus, the plurality of microlenses 120 may alter or change the correction provided by the prescription of the ophthalmic lens 110 through differences in curvature between the ophthalmic lens 110 surface and the surfaces of the plurality of microlenses 120.

Disclosed herein are several non-limiting examples describing various dimensions of example embodiments of lens elements 110 including microlenses 120. It should be appreciated that such non-limiting examples are merely for exemplary purposes, and thus should not be construed as limiting in scope.

In some non-limiting examples, each microlens 120 of the plurality of the microlenses 120 on the surface of the ophthalmic lens 110 may have a diameter (D) in a range from about 0.1 mm to 2 mm, such as 0.5 mm to 1.5 mm. In some non-limiting examples, the height, H, of each microlens 120 of the plurality of the microlenses 120 may be in a range of from about 0.01 to 0.8 mm. In some other examples, the height, H, of each microlens 120 of the plurality of the microlenses 120 may be in a range of from about 0.0008 to 0.8 mm. The height, H, of the each microlens 120 may be determined based on the desired second optical power expected from that very microlens 120.

As an example, U.S. Pat. No. 11,029,540, the content of which has been incorporated herein in its entirety by reference, describes a spectacle lens comprising a plurality of microlenses on the surface of the spectacle lens wherein each microlens comprises a diameter between 0.8 mm to 2 mm with a curvature sufficient to produce an additional refractive power of 2-5 diopters.

In some non-limiting examples, the viewer side surface of each microlens 120 may be formed into a convex spherical shape and have a larger curvature than the curvature of the viewer side surface of the ophthalmic lens 110. Thus, the refractive power of the convex spherical surface of each microlens 120 may be higher than the refractive power of the viewer side surface of the of the ophthalmic lens 110. Performance of an ophthalmic lens 110 patterned with the microlenses 120 on its surface may depend on the sharp contrast of the curvatures of the convex spherical surface of the microlenses 120 and the viewer side surface of the ophthalmic lens 110.

As can be seen in FIG. 1, each microlens 120 may comprise a convex spherical shape toward the viewer side having a larger curvature than the viewer side surface of the ophthalmic lens 110. The distance in between two microlenses 120, as shown in FIG. 1, may be the viewer side surface of the of the ophthalmic lens 110. It can be seen from FIG. 1 that there may be a sharp drop of curvatures between the convex spherical shape surface of the microlens 120 and the viewer side surface of the of the ophthalmic lens 110.

As indicated earlier, to increase the abrasion resistance on an ophthalmic lens, a hardcoating 130 may be applied on the surface of the lens 110. However, coating the surface of an ophthalmic lens 110 having microlenses 120 with an abrasion-resistant coating 130 may reduce the "sharpness" of the transition from the curvature of the microlens 120 to the curvature of the base lens 110. Increased deviation of the curvature of the transition from the curvature of the microlens 120 may diminish the control of the desired defocus, which may lead to a degradation in the performance of the patterned lens 100. As a result, both the optical power of the microlenses 120 and the effect provided by the microlenses 120 may be reduced, thereby leading to reduced effectiveness for the treatment of rapid myopic development.

The reduction of the "sharpness" of the transition from the curvatures of the microlens 120 to the base lens 110 by the application of the coating 130 may cause the curvature of the transition to undesirably deviate from the curvature of the microlens 120 when there is no hardcoating 130 present and may thereby degrade performance of the patterned lens 100. An example of such an effect is shown in FIG. 2.

Figure 2:
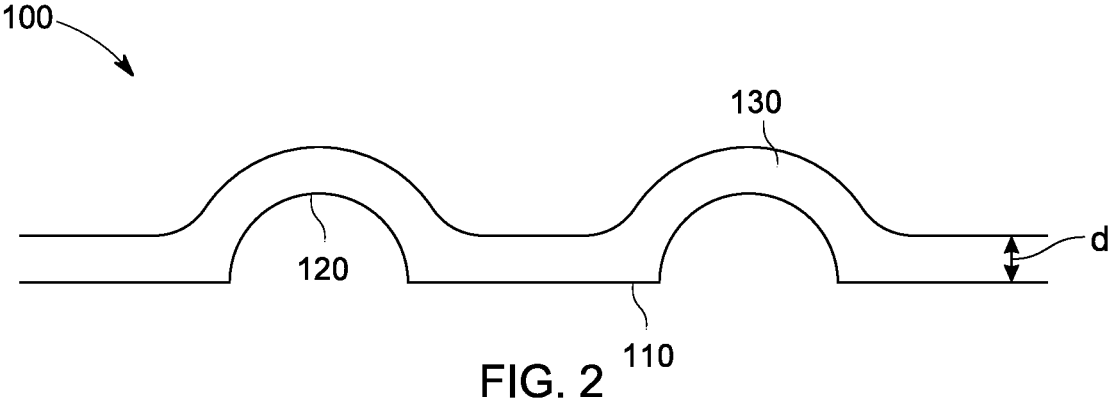
FIG. 2 is a cross-sectional view of a patterned lens including microlenses with a hardcoating applied in accordance with an example embodiment.

As shown in FIG. 2, the surface of the base lens 110 may be coated with a hardcoating 130 which may have a coating thickness, for example but not limited to "d". The height of the thickness may be measured as the height between the viewer side surface of the ophthalmic lens 110 and the outer surface of the hardcoating 130 on top of the viewer side surface of the ophthalmic lens 110. Although, the thickness of the hardcoating 130 above the convex spherical shape surfaces of the microlenses 120 is less than the height of "d"; nevertheless, the presence of the hardcoating 130 on the convex spherical shape surfaces of the microlenses 120 may reduce the "sharpness" of the transition from the curvatures of the microlens 120 to the viewer side surface of the ophthalmic lens 110.

As the hardcoating 130 thickness, d, is increased, this loss of the "sharpness" or the "feature definition" of the transition of the microlens 120 to the base lens 110 may be worsened. In some examples, the height of the feature, e.g., the microlens 120, may be similar in magnitude to the thickness of a typical hardcoating 130. This may have the effect of "washing out" the feature and negating the functional purpose of the patterned lens 100. As a result, it may be necessary to minimize the thickness of the hardcoating 130 to compensate for the degradation in the optical quality.

One potential option for limiting this undesirable effect of the hardcoating 130 on the microlenses 120 may be to reduce the thickness of the hardcoating 130. However, a reduction in thickness of the hardcoating 130 may also diminish the quality of the abrasion resistance provided by the hardcoating 130.

To mitigate this effect, in some examples, a film or sheet 140, may be formed on the front of the base lens 110 during the injection molding process. In some non-limiting examples, the sheet or film 140 may have a thickness "T". Various types of films or sheets 140 may be utilized in different embodiments. In one non-limiting example embodiment, the film or sheet 140 may be composed of polycarbonate (e.g., a polycarbonate film).

Figure 3:
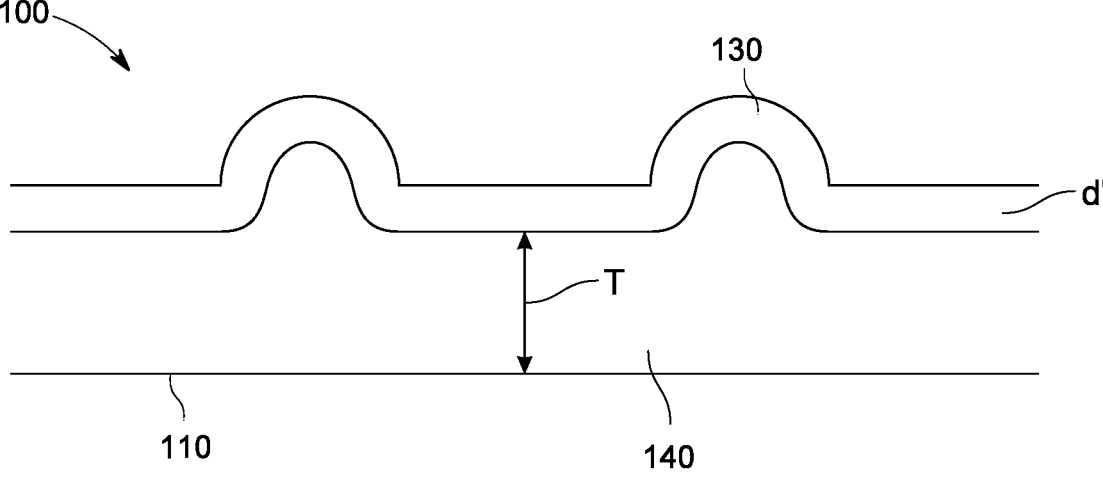
FIG. 3 is a cross-sectional view of a patterned lens including a precoated film in accordance with an example embodiment.

In some example embodiments, the film or sheet 140 may have a formable hard abrasion-resistant and/or scratch-resistant coating 130 applied to its surface prior to use in the lens 110. In some examples, a thickness of the hard abrasion-resistant and/or scratch-resistant coating 130 applied on the film or sheet 140 may have a height d', as can be seen in FIG. 3. The height d' of the thickness may be measured as the height between the viewer side surface of the film or sheet 140 and the outer surface of the hard abrasion-resistant and/or scratch-resistant coating 130 on top of the viewer side surface of the film or sheet 140.

In one example embodiment, the hard abrasion-resistant and/or scratch-resistant coatings 130 may be from a family of different materials including but not limited to siloxanes, acrylates, and urethanes. In some non-limiting examples, the hard abrasion-resistant and/or scratch-resistant coatings 130 may be prepared from curable or cross linkable compositions and the curing may be achieved by thermal or UV curing.

In some example embodiments, the hard abrasion-resistant and/or scratch-resistant coating 130 may be applied to the film or sheet 140 to increase the hardness of the surface of the film or sheet 140 and thereby improve its resistance to abrasion. Since the hard abrasion-resistant and/or scratch-resistant coating 130 may be applied on the film or sheet 140 prior to molding, the mold features may be replicated in the surface of the abrasion-resistant and/or scratch-resistant coating 130 as shown schematically in FIG. 3.

Continuing to reference FIG. 3, it can be seen that a film or sheet 140, e.g., a polycarbonate film, of thickness T may be contained on the front of the molded polycarbonate lens 110. The front or the viewer side surface of the film or sheet 140 may be away from the injection molding process, and thus may have been precoated with a hardcoating 130 of thickness d'. Such a hardcoating 130 may be referred to as the Base Layer (BL) 130.

In some example embodiments, the film or sheet 140 may be coated on the viewer side surface prior to introducing the base lens 110 with the film or sheet 140 to the injection molding process. During injection molding, the BL or the hardcoating 130 may replicate the features of the mold as in the case shown in FIG. 1, where the features or patterns, e.g., the microlenses 120, may be replicated in the thermoplastic lens material.

In one example embodiment, the BL 130 may be formed from a material that is not fully cured to so as to provide greater flexibility during the injection molding/forming process. Such a configuration may aid in replication of the mold insert pattern without cracking. The curing of the hardcoating 130 may be completed after the injection molding to maximize the hardness.

In some example embodiments, the microlenses 120 may be formed on the BL 130 or the first hardcoating layer 130. The final hard abrasion-resistant and/or scratch-resistant coating 130' may then be applied on the microlenses with a lesser thickness d than would normally be required to achieve a specified level of abrasion resistance. By allowing a reduction in the required thickness of final hardcoating 130' while still achieving the required abrasion resistance, the optical performance of the microlens features may be better maintained.

Figure 4:
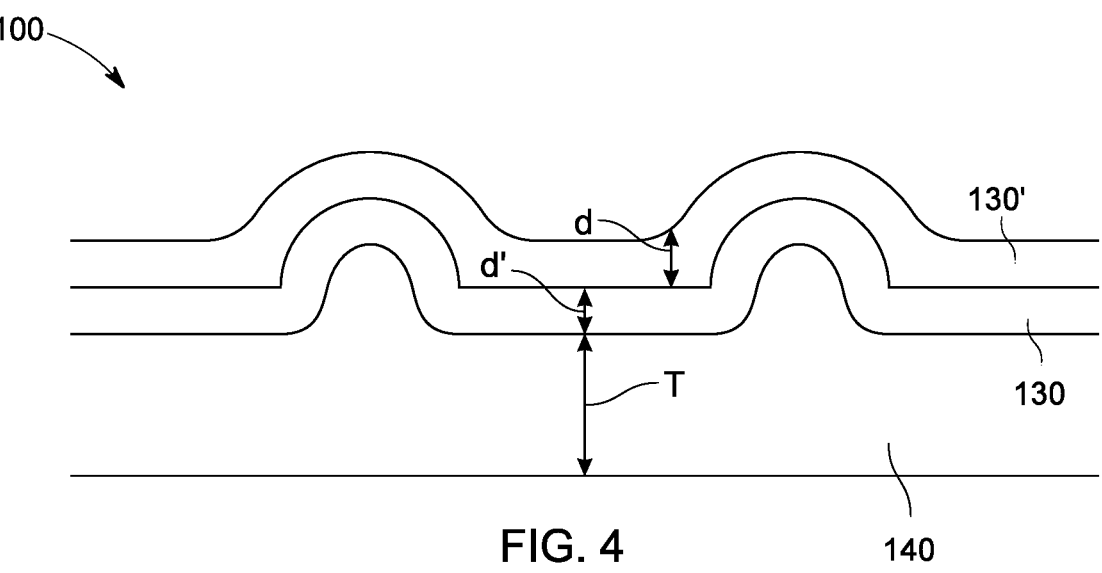
FIG. 4 is a cross-sectional view of a patterned lens including a combination of a base layer and hardcoating in accordance with an example embodiment.

In some example embodiments, the final hardcoating 130' with a thickness d may be applied on the plurality of the microlenses 120 by using, for example, dip coating. Such a configuration is shown schematically in FIG. 4.

The hardcoating 130' thickness d on the top outermost surface may be thin enough so as to minimize any degradation of the transition between the feature, e.g., a microlens 120, and the base lens curve shape. Moreover, the BL 130 of the first hardcoating 130 may provide additional abrasion resistance by providing an increased surface hardness relative to the underlying lens material 110.

To the extent there is deformation of the underlying sheet or film 140 or polycarbonate lens material 110 in the areas of the microlenses 120, the materials used for the various layers in one embodiment may have indices that may be sufficiently similar to minimize any associated error. For example, the final hardcoating 130' over the microlenses 120 may have a refractive index 1.5, the base layer BL hardcoating 130 may also have a refractive index of 1.5, and the sheet or film 140 and lens 110 material, e.g., polycarbonate, may have a refractive index of 1.59. In such an example embodiment, the largest refractive index step may be 0.09 between the polycarbonate film and the final hardcoating 130' or the BL hardcoating 130 layer. This refractive index step may be much smaller when compared to 1.5 for the refractive index step in an arrangement from air to the hardcoated patterned feature in the absence of the film, e.g., a microlens 120, which may dominate the refractive effects. In some cases it may be necessary to modify the microlens element design to account for a difference in index when molding a Base Layer (BL) rather than the underlying lens material of a different refractive index.

Figure 5:
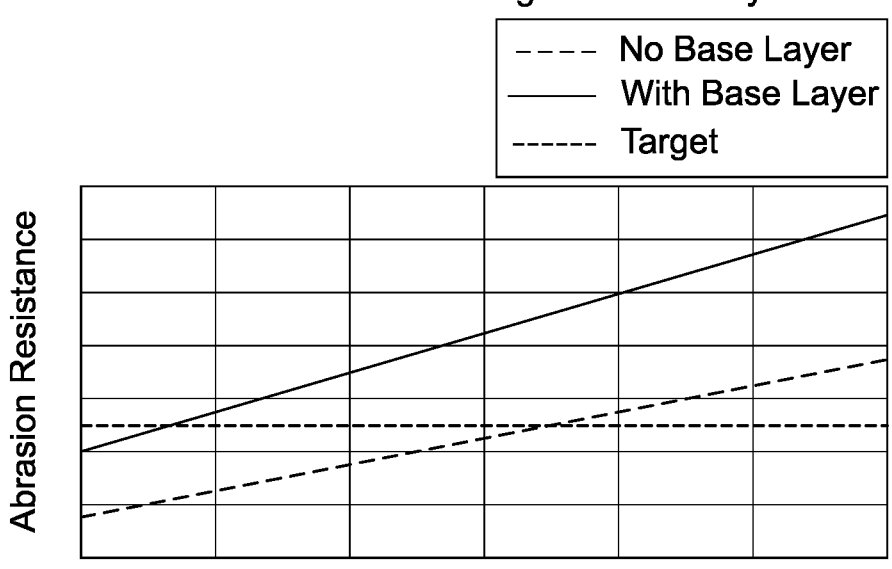
FIG. 5 is a graph showing abrasion resistance improvement in accordance with an example embodiment.

One benefit of the base layer BL 130 may be to increase the abrasion resistance by providing a superior base layer. One benefit of this is shown in FIG. 5.

Abrasion resistance can be measured in various ways, including Bayer and steel wool abrasion testing. The data in FIG. 5 is for illustrative purposes and thus should not be construed as limiting in scope. For a target abrasion resistant value of 5, the hardcoat alone may require a thickness of near 2.75 microns. Such a thickness may lead to undesirable degradation to the optical properties of the lens as discussed above. However, with the use of a BL as discussed above, the hardcoat thickness may be reduced to 1.3 microns for the target abrasion resistant value of 5 and still achieve the desired abrasion resistance and also the desired optical performance.

U.S. Pat. No. 7,500,749 discloses a process to produce an optical article with injection molding process and is hereby incorporated by reference in its entirety.

Example embodiments are described in more detail below. However, it should be appreciated that any methods, steps, systems, devices, and/or values shown and/or described below are merely for exemplary, illustrative purposes. Thus, the scope of the present invention should not be construed as limited by the following example embodiments.

In an example embodiment, polycarbonate film may be precoated on one side with a thermal formable coating. An example embodiment may use a coating with a flexible coating polymer. Another example embodiment may rely on partially curing the coating before in-mold injection molding as described in U.S. Pat. No. 7,500,749, which has been incorporated by reference in its entirety above.

In another example embodiment, a thermal formable coating which may be dual thermally cured in combination with UV cured coating. After the coating solution has been applied onto the polycarbonate film, the coated film may be thermally cured, resulting in a transparent coating while retaining good adhesion to polycarbonate and passing initial crosshatch adhesion tape testing. Such a thermally cured only coating may be flexible and thermoformable.

Such a precoated polycarbonate film may be used in the in-mold injection molding process to produce a precoated article. The coating at the time of injection molding may be flexible, thereby allowing formation into the article shape without cracking of the coating. When dual cured coating is utilized, the coating may then be completed by UV curing to form a scratch-resistant coating.

Non-limiting examples of commercially available coated polycarbonate film include, e.g., Lexan HP92S and Lexan HP92T from Sabic, 5X36 Indoor AR PC and Poly 12323 from TechPlast, Makrolon HF312 and Makrolon HF278 from Covestro; and Planlite PC-710A, and PC-SB50 from Teijin.

A first example embodiment may comprise injection molding of a polycarbonate lens with precoated HF312 film and the addition of conventional hard coating with a Bayer ratio of about 1.7. Such a first example embodiment may utilize 15 mil precoated polycarbonate film having a coating thickness of 14 microns. The polycarbonate film may be UV cured without completion of a thermal cure.

The HF312 film may be laminated with another 12 mil polycarbonate film to form a photochromic laminate. The photochromic laminate may then be cut into a flat, round-shaped wafter and produced into a 6-base photochromic lens with an in-mold injection process so that the coating is on the convex side of the lens. In such an example embodiment, the coating may not be hazy and visual inspection may not show any signs of coating crack. The lens may then be exposed to UV light, such as with a mercy D-bulb lamp to a UVA dosage of 2000 mJ/cm2 to complete the curing of the coating.

Subsequently, a scratch resistance coating including a 0.2 micron primer layer and a 1.8 micron hardcoat layer may be applied on the above lens with the dip coating process, followed by a curing of six hours at 235 degrees Fahrenheit. Abrasion resistant testing may be performed on the lens resulting in a Bayer ratio of about 1.7.

A second example embodiment may comprise injection molding of a polycarbonate lens with an uncoated polycarbonate film and the addition of a conventional lens hard coating with a Bayer ratio of about 0.9. An uncoated, flat, round-shaped 6-base photochromic polycarbonate wafer may be injection molded into the lens. The lens itself may be coated with Crystalcoat 1165 and Crystalcoat 1154, with abrasion resistant testing resulting in a Bayer ratio of about 0.9. Thus, the first example embodiment may show an improvement of about 89% when compared to standard methods of lens production contained in the second example embodiment.

A third example embodiment may comprise injection molding of a polycarbonate lens with precoated HF278 film and the conventional hard coating of the polycarbonate lens with a Bayer ratio of about 1.9. In such an example embodiment, a 15 mil precoated polycarbonate film may be utilized, similar to the first example embodiment. A 6-base polycarbonate lens may be produced using the same or a similar process to what was described in the second example embodiment, except that the 15 mil precoated polycarbonate film may be precoated HF278 film. Abrasion resistant testing may result in a Bayer ratio of about 1.9, showing an improvement of about 100% when compared to standard methods of lens production contained in the second example embodiment.

A fourth example embodiment may comprise injection molding of a precoated polycarbonate lens. In such an example embodiment, samples may be prepared using an additional UV curable coating applied to polycarbonate photochromic laminate samples. The UV curable coating may be applied in house (e.g., not precoated) to allow greater control over the degree of curing, which influences the coating hardness and modulus in molding. The coated film may employ a coating resin of 1 micro thickness which may be partially cured with UV light followed by a thermal cure cycle (e.g., greater than 100 degrees Celsius) or additional UV curving. The applied hard coating may have a thickness of about 2 microns with a primer layer of about 0.2 microns. The hard coating may be applied to the molded lens (with or without laminate).

Bayer testing of such an embodiment with hard coat only may result in a Bayer ratio of about 3.1. Bayer testing of such an embodiment with wafer coating only on laminate (e.g., molded to the lens) may result in a Bayer ratio of about 1.3. Bayer testing of such an embodiment with hard coating and wafer coating on laminate (e.g., molded to the lens) may result in a Bayer ratio of about 5.6. In all three such embodiments, cross hatch adhesion may pass tests.

The wafer coating itself may be seen to provide some base abrasion resistance. However, combination with a hard coating may significantly increase its Bayer abrasion value, including just using a wafer coating alone or using hard coating alone. Thus, the efficacy of the above example embodiments has clearly demonstrated efficacy for improving abrasion resistance.

A fifth example embodiment may demonstrate feature replication. A series of lenses may be prepared with and without coated film to compare the lens geometry from a patterned mold. The coated film may match that of the above example embodiment. The mold pattern may be similar to that which is shown and/or described in U.S. Pat. No. 11,397,335, which discloses an array of independent island shape areas of curvature greater than the base curve of the mold insert (i.e., "lenslets") and which is hereby incorporated by reference in its entirety.

The lenslets may have a typical nominal diameter of about 0.98 mm with a height of about 0.75 microns. The coated film may employ a coating resin of about 1 micron thickness which may be partially cured with UV light followed by a thermal cure cycle (e.g., greater than 100 degrees Celsius) or additional UV curing. The geometry of the molded lens may be measured using an interferometer, such as a Zygo Nuview.

The results of such an example embodiment are illustrated in FIG. 6, with "Fit R Seg Dia Ave" representing the microlens diameter, "Fit R Seg Height Ave" representing the average microlens height, "Calib Fit R Defocus (D)" representing the microlens optical power in diopters, and "Base Curve" representing the effective base curve of the lens, also measured in diopters. The p-Value may represent a comparison of the lens made with and without coated laminate from a single factor ANOVA test.

The diameter and height may be statistically equivalent based on the p-Value, but the curve powers expressed in diopters may be statistically different. However, any deviations between the results are small and may be easily compensated with a modification to the insert design, if necessary. The lenses after molding may remain clear and show no evidence of cracking or damage to the coating on the laminate surface after incorporation into a lens. Thus, the combined data such as shown in FIG. 6 clearly shows the ability for the use of a precoated laminate to improve abrasion resistance of a lens while still allowing replication of patterned surfaces in the final lens geometry.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of forming a patterned lens having improved abrasion resistance, comprising:

providing a film or sheet comprising a polymeric material and having a first surface coated with an abrasion resistant coating;

placing the film or sheet into a lens mold such that the coated surface faces a mold cavity;

injecting a thermoplastic into the lens mold behind the film or sheet to form a lens; and replicating one or more optical features from the lens mold into the film or sheet and the abrasion resistant coating.

2. The method of claim 1, wherein the optical features comprise a plurality of microlenses.

3. The method of claim 1, wherein the abrasion resistant coating is partially cured before injection molding.

4. The method of claim 3, further comprising fully curing the abrasion-resistant coating after injection molding using heat, ultraviolet light, or visible light.

5. The method of claim 3, further comprising curing the coating.

6. The method of claim 1, wherein the film or sheet is composed of polycarbonate.

7. The method of claim 1, wherein the abrasion resistant coating comprises a material selected from the group consisting of siloxanes, acrylates, and urethanes.

8. The method of claim 7, wherein a second abrasion resistant coating applied to the formed lens is applied via spin coating.

9. The method of claim 1, further applying an abrasion resistant coating to the formed lens.

10. The method of claim 1, wherein a thickness of the film or sheet is between 0.1-2.0 millimeters and wherein a thickness of the coating is between 0.5-20 microns.

11. The method of claim 1, wherein the thermoplastic comprises nylon.

12. The method of claim 1, wherein the coated film or sheet is formed into a wafer prior to insertion into the mold.

13. A method of forming a patterned lens having improved abrasion resistance, comprising:

providing a film or sheet comprising a polymeric material and having a first surface coated with a first abrasion resistant coating;

placing the film or sheet into a lens mold such that the coated surface faces the mold cavity;

injecting a thermoplastic into the mold behind the film or sheet to form a lens;

replicating one or more optical features from the mold into the abrasion resistant coating and film;

and applying a second abrasion resistant coating to the formed lens.

14. The method of claim 13, wherein the second coating is applied to the first coating via spin coating.

15. The method of claim 13, wherein a thickness of the second coating is less than a thickness of the first coating.

16. The method of claim 13, wherein the film or sheet is comprised of a wafer.

* * * * *